United States Patent
Toshioka et al.

(10) Patent No.: US 8,540,953 B2
(45) Date of Patent: Sep. 24, 2013

(54) EXHAUST GAS CONTROL APPARATUS AND REDUCTANT DISPENSING METHOD FOR INTERNAL COMBUSTION ENGINE

(75) Inventors: Shunsuke Toshioka, Susono (JP); Shinya Hirota, Susono (JP); Koichiro Fukuda, Numazu (JP); Takafumi Yamauchi, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/807,133

(22) PCT Filed: Jul. 6, 2011

(86) PCT No.: PCT/IB2011/001567
§ 371 (c)(1),
(2), (4) Date: Dec. 27, 2012

(87) PCT Pub. No.: WO2012/004648
PCT Pub. Date: Jan. 12, 2012

(65) Prior Publication Data
US 2013/0108529 A1    May 2, 2013

(30) Foreign Application Priority Data

Jul. 7, 2010   (JP) .................................. 2010-154817

(51) Int. Cl.
*B01D 53/56*  (2006.01)
*B01D 53/94*  (2006.01)
*F01N 3/10*   (2006.01)
*F01N 3/28*   (2006.01)

(52) U.S. Cl.
USPC ........ 423/213.2; 422/105; 422/108; 422/111; 60/274; 60/299; 60/301; 700/266; 700/271

(58) Field of Classification Search
USPC ........ 423/213.2; 422/105, 108, 111; 60/274, 60/299, 301; 700/266, 271
See application file for complete search history.

(56) References Cited

U.S. PATENT DOCUMENTS

2003/0182935 A1    10/2003  Kawai et al.
2010/0209327 A1 *   8/2010  Soeger et al. .............. 423/239.2

FOREIGN PATENT DOCUMENTS

| JP | A-2003-293737 | 10/2003 |
| JP | A-2003-293738 | 10/2003 |
| JP | A-2003-314256 | 11/2003 |

* cited by examiner

*Primary Examiner* — Timothy Vanoy
(74) *Attorney, Agent, or Firm* — Oliff & Berridge, PLC (57) ABSTRACT

Utilizing the finding that the state of adsorption of $NH_3$ on a selective reduction type NOx catalyst includes a weakly adsorbed state in which the adsorbed $NH_3$ is useful for a reduction reaction of NOx and a strongly adsorbed state in which the adsorbed $NH_3$ is not useful for the reduction reaction of NOx unless the state of adsorption is changed into the weakly adsorbed state, the apparatus of the invention includes an actual weakly-adsorbed amount-calculation $NH_3$ that is adsorbed on the selective reduction type NOx catalyst in the weakly adsorbed state, and a dispensation control portion that performs a dispensation control of the reductant dispensed by a reductant-dispensation portion, according to the actual weakly adsorbed amount calculated by the actual weakly adsorbed amount calculation portion.

7 Claims, 10 Drawing Sheets

EXHAUST GAS CONTROL APPARATUS AND REDUCTANT DISPENSING METHOD FOR INTERNAL COMBUSTION ENGINE

BACKGROUND OF THE INVENTION

1. Field of the Invention

The invention relates to an exhaust gas control apparatus and a reductant dispensing method for an internal combustion engine.

2. Description of the Related Art

A known technology related to this invention is a urea SCR system in which a selective catalytic reduction type NOx catalyst (hereinafter, referred to as "SCR catalyst") that removes NOx from exhaust gas by adsorbing $NH_3$ (ammonia) is disposed in an exhaust passageway of an internal combustion engine, and in which a reductant dispensation portion supplies a reductant to the SCR catalyst. In a urea SCR system disclosed in Japanese Patent Application Publication No. 2003-293737 (JP-A-2003-293737), the amount of consumption of $NH_3$ adsorbed to the SCR catalyst is found on the basis of the amount of NOx discharged from the internal combustion engine and a NOx removal rate of the SCR catalyst that is derived by a removal rate derivation portion. The adsorbed amount of $NH_3$ adsorbed on the SCR catalyst is found according to the amount of consumption of $NH_3$ found as described above and the dispensed amount of the reductant supplied to the SCR catalyst. Then, on the basis of the thus-found the adsorbed $NH_3$ amount and a predetermined target adsorbed $NH_3$ amount that is slightly lower than a saturated adsorbed $NH_3$ amount on the SCR catalyst, the dispensation of the reductant is controlled.

However, the present inventors have discovered that the state of adsorption of $NH_3$ on the SCR catalyst includes a weakly adsorbed state and a strongly adsorbed state. The weakly adsorbed state is a state in which the $NH_3$ adsorbed on the SCR catalyst is useful for the reduction reaction of NOx. On the other hand, the strongly adsorbed state is a state in which the $NH_3$ adsorbed on the SCR catalyst is not useful for the reduction reaction of NOx unless the state is changed into the weakly adsorbed state. Therefore, it has come to be understood that in the case where the dispensation of the reductant is controlled on the basis of the amount of $NH_3$ adsorbed on the SCR catalyst as in the urea SCR system disclosed in Japanese Patent Application Publication No. 2003-293737 (JP-A-2003-293737), the NOx removal rate cannot be increased, if the state of adsorption of $NH_3$ on the SCR catalyst is not taken into account but only the total adsorbed amount of $NH_3$ on the SCR catalyst is taken into account. Thus, in order to increase the NOx removal rate, the reductant dispensation control needs to be performed in light of the adsorbed state of $NH_3$ suitable for removal of NOx.

SUMMARY OF THE INVENTION

The invention provides a technology of performing an optimum dispensation control of a reductant in an exhaust gas control apparatus for an internal combustion engine by taking into account the adsorbed state of $NH_3$ on a selective reduction type NOx catalyst.

A first aspect of the invention relates to an internal combustion engine exhaust gas control apparatus that includes: a selective reduction type NOx catalyst disposed in an exhaust passageway of an internal combustion engine, wherein state of adsorption of $NH_3$ on the selective reduction type NOx catalyst includes a weakly adsorbed state in which $NH_3$ adsorbed on the NOx catalyst is useful for a reduction reaction of NOx, and a strongly adsorbed state in which $NH_3$ adsorbed on the NOx catalyst is not useful for the reduction reaction of the NOx unless the state of adsorption of $NH_3$ is changed into the weakly adsorbed state; a reductant dispensation portion that is disposed in the exhaust passageway upstream of the selective reduction type NOx catalyst and that dispenses a reductant for supplying $NH_3$ to the selective reduction type NOx catalyst; an actual weakly adsorbed amount calculation portion that calculates an actual weakly adsorbed amount of $NH_3$ that is adsorbed on the selective reduction type NOx catalyst in the weakly adsorbed state; and a dispensation control portion that performs a dispensation control of the reductant dispensed by the reductant dispensation portion, according to the actual weakly adsorbed amount calculated by the actual weakly adsorbed amount calculation portion.

According to the foregoing construction, the exhaust gas control apparatus calculates the actual weakly adsorbed amount, and performs the dispensation control of the reductant according to the calculated actual weakly adsorbed amount. Therefore, the dispensation control of the reductant is performed according to only the actual weakly adsorbed amount, without taking the actual strongly adsorbed amount into account, so that it is possible to perform a control in which of the adsorbed $NH_3$ amount that is adsorbed on the selective reduction type NOx catalyst, only the adsorbed $NH_3$ amount that contributes to the removal of NOx is utilized. Hence, the drawback in the dispensation control of the reductant that is caused by taking into account the adsorbed $NH_3$ amount that does not contribute to the removal of NOx disappears, and an optimum dispensation control of the reductant with respect to the selective reduction type NOx catalyst can be carried out.

The exhaust gas control apparatus in accordance with this aspect of the invention may further include a target weakly adsorbed amount calculation portion that calculates a target weakly adsorbed amount of $NH_3$ that is to be adsorbed on the selective reduction type NOx catalyst in the weakly adsorbed state, and the dispensation control portion may perform the dispensation control of the reductant dispensed by the reductant dispensation in such a control manner that the actual weakly adsorbed amount calculated by the actual weakly adsorbed amount calculation portion becomes equal to the target weakly adsorbed amount calculated by the target weakly adsorbed amount calculation portion.

According to the foregoing construction, an optimum target weakly adsorbed amount of $NH_3$ that is adsorbed to the selective reduction type NOx catalyst in the weakly adsorbed state is calculated. The target weakly adsorbed amount is determined on the basis of a balance between reduction of the NOx removal rate due to small amount of $NH_3$ in the weakly adsorbed state and occurrence of the passage of $NH_3$ through the catalyst due to large amount of $NH_3$ in the weakly adsorbed state. Then, the dispensation control of the reductant, is performed so that the actual weakly adsorbed amount of $NH_3$ becomes, equal to the target weakly adsorbed amount. Hence, the actual weakly adsorbed amount approaches an optimum adsorbed $NH_3$ amount that contributes to the removal of NOx, so that an optimum dispensation control of the reductant can be performed on the selective reduction type NOx catalyst.

The exhaust gas control apparatus in accordance with this aspect of the invention may further include: a first NOx concentration acquisition portion that acquires information about NOx concentration in exhaust gas that flows into the selective reduction type NOx catalyst; a second NOx concentration acquisition portion that acquires information about the NOx concentration in the exhaust gas that flows out from the selective reduction type NOx catalyst; a NOx removal rate calculation portion that calculates a NOx removal rate of the selective reduction type NOx catalyst from the information about the NOx concentration acquired by the first NOx concentration acquisition portion and the information about the NOx concentration acquired by the second NOx concentration acquisition portion; and a catalyst temperature acquisition portion that acquires information about temperature of the selective reduction type NOx catalyst. The actual weakly adsorbed amount calculation portion may calculate the actual weakly adsorbed amount based on amount of consumption of $NH_3$ derived from the NOx removal rate calculated by the NOx removal rate calculation portion, the information about the temperature of the selective reduction type NOx catalyst acquired by the catalyst temperature acquisition portion, amount of shift of $NH_3$ between the strongly adsorbed state and the weakly adsorbed state, and a previously dispensed amount of the reductant, and an estimation model for the actual weakly adsorbed amount. The target weakly adsorbed amount calculation portion may calculate the target weakly adsorbed amount based on the amount of consumption of $NH_3$ derived from the NOx removal rate calculated by the NOx removal rate calculation portion, the information about the temperature of the selective reduction type NOx catalyst acquired by the catalyst temperature acquisition portion, and a saturated characteristic of the actual weakly adsorbed amount.

According to the foregoing construction, the actual weakly adsorbed amount and the target weakly adsorbed amount can be calculated.

The exhaust gas control apparatus in accordance with the aspect of the invention may further include: an actual strongly adsorbed amount calculation portion that calculates an actual strongly adsorbed amount of NH3 that is adsorbed on the selective reduction type NOx catalyst in the strongly adsorbed state; and a temperature raise control portion that raises temperature of the selective reduction type NOx catalyst if the actual strongly adsorbed amount calculated by the actual strongly adsorbed amount calculation portion exceeds a predetermined amount that is used as a threshold value for determining whether or not passage of high-concentration $NH_3$ through the selective reduction type NOx catalyst is about to occur.

According to the foregoing construction, if the temperature of the selective reduction type NOx catalyst rises, the $NH_3$ in the strongly adsorbed state changes into the weakly adsorbed state and, furthermore, desorbs from the catalyst. Therefore, if the calculated actual strongly adsorbed amount exceeds the predetermined amount, the actual strongly adsorbed amount of $NH_3$ can be reduced by raising the temperature of the selective reduction type NOx catalyst. Due to this, it is possible to avoid an event in which the actual strongly adsorbed amount becomes excessively large and the adsorbed $NH_3$ amount on the selective reduction type NOx catalyst reaches a saturation level, leading to the passage of high-concentration of $NH_3$ through the catalyst.

In the exhaust gas control apparatus in accordance with the foregoing aspect, the weakly adsorbed state may be a state in which $NH_3$ adsorbed on the NOx catalyst functions as the reductant in the reduction reaction of NOx, and the strongly adsorbed state may be a state in which $NH_3$ adsorbed on the NOx catalyst does not function as the reductant in the reduction reaction of NOx.

A second aspect of the invention relates to a reductant dispensing method for an internal combustion engine exhaust gas control apparatus that includes a selective reduction type NOx catalyst disposed in an exhaust passageway of an internal combustion engine, and a reductant dispensation portion that is disposed in the exhaust passageway upstream of the selective reduction type NOx catalyst and that dispenses a reductant for supplying $NH_3$ to the selective reduction type NOx catalyst. This reductant dispensing method includes: calculating an actual weakly adsorbed amount of $NH_3$ that is adsorbed on the selective reduction type NOx catalyst in a weakly adsorbed state in which $NH_3$ adsorbed on the selective reduction type NOx catalyst is useful for a reduction reaction of NOx; and performing a dispensation control of the reductant dispensed by the reductant dispensation portion, according to the actual weakly adsorbed amount calculated, wherein state of adsorption of $NH_3$ on the selective reduction type NOx catalyst includes the weakly adsorbed state, and a strongly adsorbed state in which $NH_3$ adsorbed on the NOx catalyst is not useful for the reduction reaction of the NOx unless the state of adsorption of $NH_3$ is changed into the weakly adsorbed state.

According to the foregoing construction, the drawback in the dispensation control of the reductant that is caused by taking into account the adsorbed $NH_3$ amount that does not contribute to the removal of NOx disappears, and an optimum dispensation control of the reductant with respect to the selective reduction type NOx catalyst can be carried out.

In the reductant dispensing method of this aspect, the weakly adsorbed state may be a state in which $NH_3$ adsorbed on the NOx catalyst functions as the reductant in the reduction reaction of NOx, and the strongly adsorbed state may be a state in which $NH_3$ adsorbed on the NOx catalyst does not function as the reductant in the reduction reaction of NOx.

According to the invention, in the internal combustion engine exhaust gas control apparatus, an optimum dispensation control of the reductant can be carried out by taking into account the state of adsorption of $NH_3$ on the selective reduction type NOx catalyst.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Concrete embodiments of the invention will be described below.

Embodiment (Internal Combustion Engine)

Figure 1:
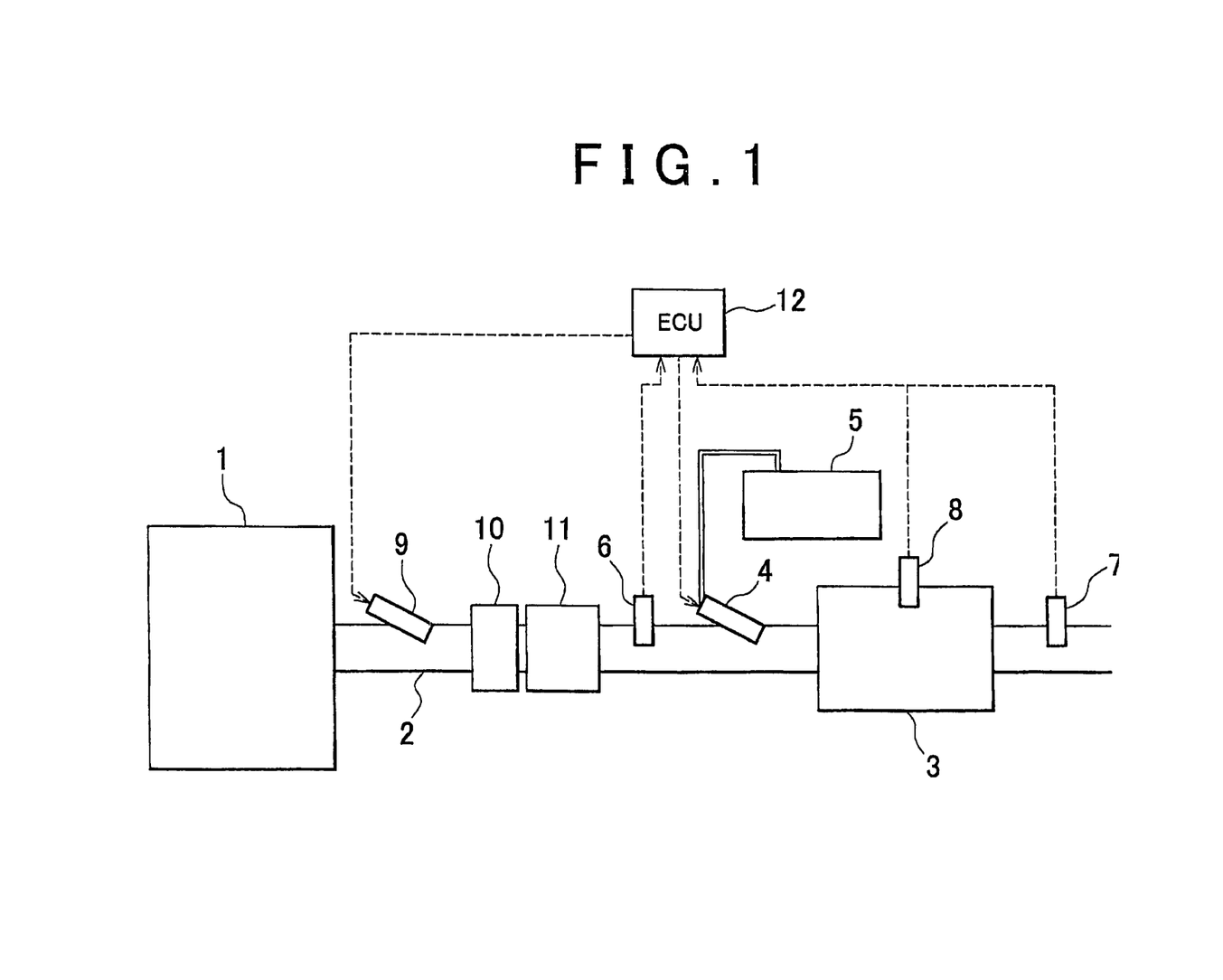
FIG. 1 is a diagram showing a general construction of an internal combustion engine in accordance with an embodiment of the invention.

FIG. 1 is a diagram showing a general construction of an internal combustion engine in accordance with an embodiment of the invention. An internal combustion engine 1 shown in FIG. 1 is a four-stroke diesel engine with four cylinders for use for driving a vehicle. An exhaust passageway 2 for passing exhaust gas discharged from the internal combustion engine 1 is connected to the internal combustion engine 1.

A selective catalytic reduction type NOx catalyst (hereinafter, referred to as SCR catalyst) 3 is disposed in an intermediate portion of the exhaust passageway 2. The SCR catalyst 3 reductively removes NOx from exhaust gas by using $NH_3$ (ammonia). For example, NO is reduced to $N_2$ by a reaction such as $4NO+4NH_3+O_2 \rightarrow 4N_2+6H_2O$. $NO_2$ is reduced to $N_2$ by a reaction such as $6NO_2+8NH_3 \rightarrow 7N_2+12H_2O$. NO and $NO_2$ are reduced to $N_2$ by a reaction such as $NO+NO_2+2NH_3 \rightarrow 2N_2+3H_2O$. Besides, the SCR catalyst 3 has a function of adsorbing $NH_3$. The SCR catalyst 3 is formed from zeolite or the like.

The exhaust passageway 2 upstream of the SCR catalyst 3 is provided with a urea water dispensation valve 4 that dispenses a urea aqueous solution (hereinafter, referred to as urea water) as a reductant that is hydrolyzed into $NH_3$ that is to be supplied to the SCR catalyst 3. The urea water dispensation valve 4 injects urea water stored in a urea water tank 5, into the exhaust passageway 2 on the basis of a command. The injected urea water is hydrolyzed to produce $NH_3$ by exhaust heat in a reaction such as $(NH_2)_2CO+H_2O \rightarrow 2NH_3+CO_2$. The urea water dispensation valve 4 is an example of a reductant dispensation portion in the invention. The reductant used herein may be not only urea water but also ammonia-based solutions such as an ammonia aqueous solution or the like.

A first NOx sensor 6 that detects the NOx concentration in exhaust gas that flows into the SCR catalyst 3 is disposed in the exhaust passageway 2 immediately upstream of the urea water dispensation valve 4. The first NOx sensor 6 is an example of a first NOx concentration acquisition portion in the invention. A second NOx sensor 7 that detects the NOx concentration exhaust gas that flows out from the SCR catalyst 3 is disposed in the exhaust passageway 2 immediately downstream of the SCR catalyst 3. The second NOx sensor 7 is an example of a second NOx concentration acquisition portion in the invention. The first NOx concentration acquisition portion and the second NOx concentration acquisition portion may estimate the NOx concentration from a state of operation of the internal combustion engine 1 and a NOx concentration estimation map that is obtained beforehand through calculation. The SCR catalyst 3 is provided with a temperature sensor 8 that detects the SCR catalyst bed temperature. The temperature sensor 8 is an example of a catalyst temperature acquisition portion in the invention. Incidentally, the catalyst temperature acquisition portion may estimate the SCR catalyst bed temperature from the exhaust gas temperature detected by a temperature sensor disposed in the exhaust passageway 2 and a pre-calculated catalyst bed temperature estimation map.

A fuel dispensation valve 9, an oxidation catalyst 10 and a DPF (diesel particulate filter) 11 are disposed in that order in the exhaust passageway 2 upstream of the first NOx sensor 6. The oxidation catalyst 10 oxidizes HC, CO, etc. in exhaust gas. The DPF 11 traps particulate matter in exhaust gas that flows through the exhaust passageway 2. The fuel dispensation valve 9 is a valve for dispensing fuel into the exhaust passageway 2. Particularly when an amount of particulate matter equal to or greater than a prescribed amount deposits on the DPF 11, the fuel dispensation valve 9 dispenses fuel. The fuel dispensed from the fuel dispensation valve 9 is oxidized on the oxidation catalyst 10, so that exhaust gas is heated. The heated exhaust gas then flows into the DPF 11, and oxidatively removes the particulate matter from the DPF 11. The control of oxidatively removing the particulate matter that has deposited on the DPF 11 in this manner is termed the forced filter regeneration control.

The internal combustion engine 1 constructed as described above is provided with an electronic control unit (hereinafter, referred to as ECU) 12. The ECU 12 is electrically connected to the first NOx sensor 6, the second NOx sensor 7 and the temperature sensor 8 as well as a crank position sensor and an accelerator operation amount sensor that are not shown. The output signals from these sensors are input to the ECU 12. Besides, the ECU 12 is electrically connected to the urea water dispensation valve 4 and, the fuel dispensation valve 9, and controls these valves.

(Urea Water Dispensation Control)

A known method of dispensing urea water to the SCR catalyst 3 is a method in which using the $NH_3$ adsorbing function of the SCR catalyst 3, $NH_3$ is adsorbed to the SCR catalyst beforehand to a target adsorbed amount that does not exceed the saturated adsorbed amount, and if $NH_3$, whose amount is kept by reduction of NOx, is consumed, an amount of urea water commensurate with the consumed amount of $NH_3$ is supplied so that the adsorbed $NH_3$ amount is kept at the target adsorbed amount. According to the findings made by the present inventors, in the foregoing method, a portion of the adsorbed amount of $NH_3$ does not contribute to the removal of NOx.

Figure 2:
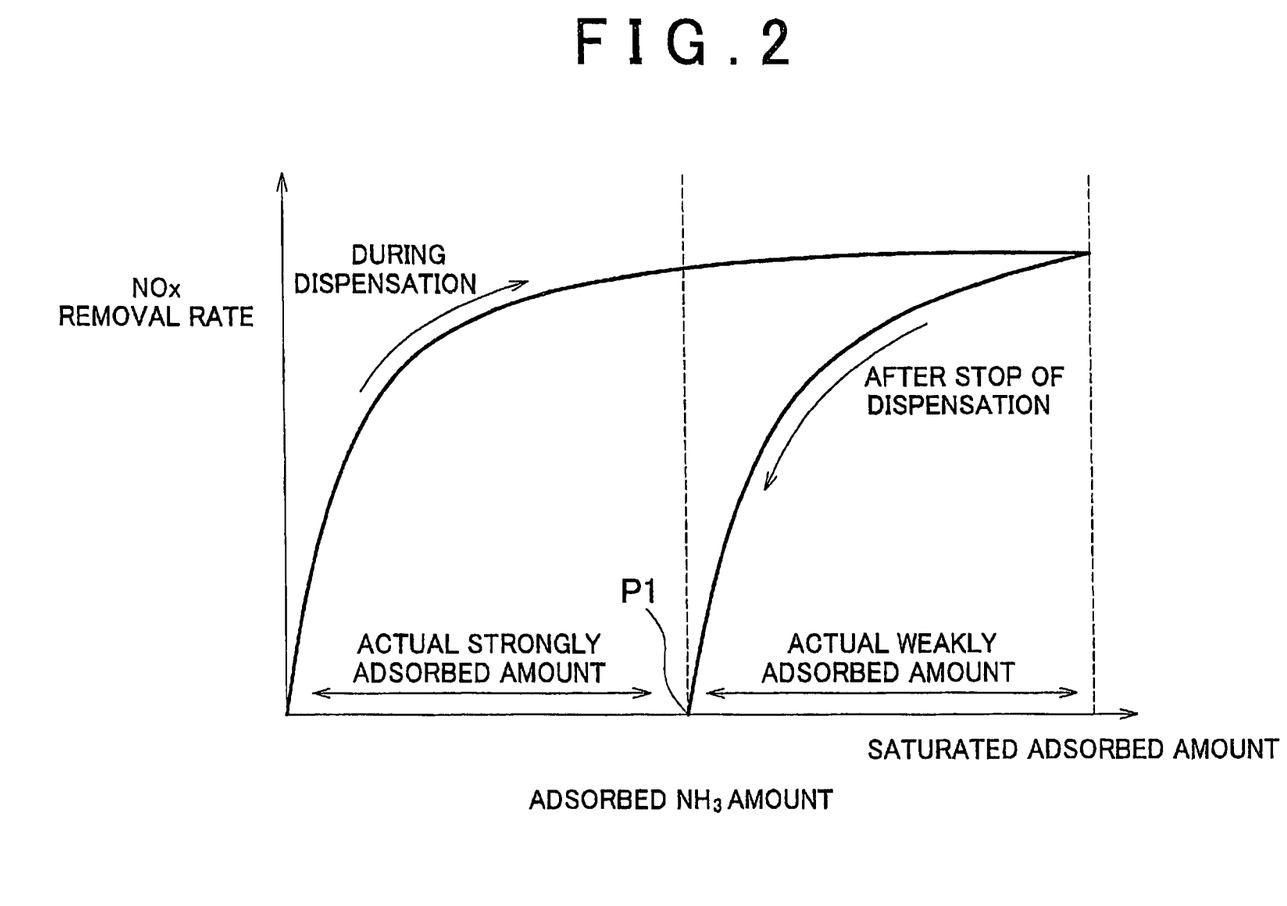
FIG. 2 is a diagram showing a relationship between the adsorbed $NH_3$ amount on the SCR catalyst and the NOx removal rate thereof.
Figure 3:
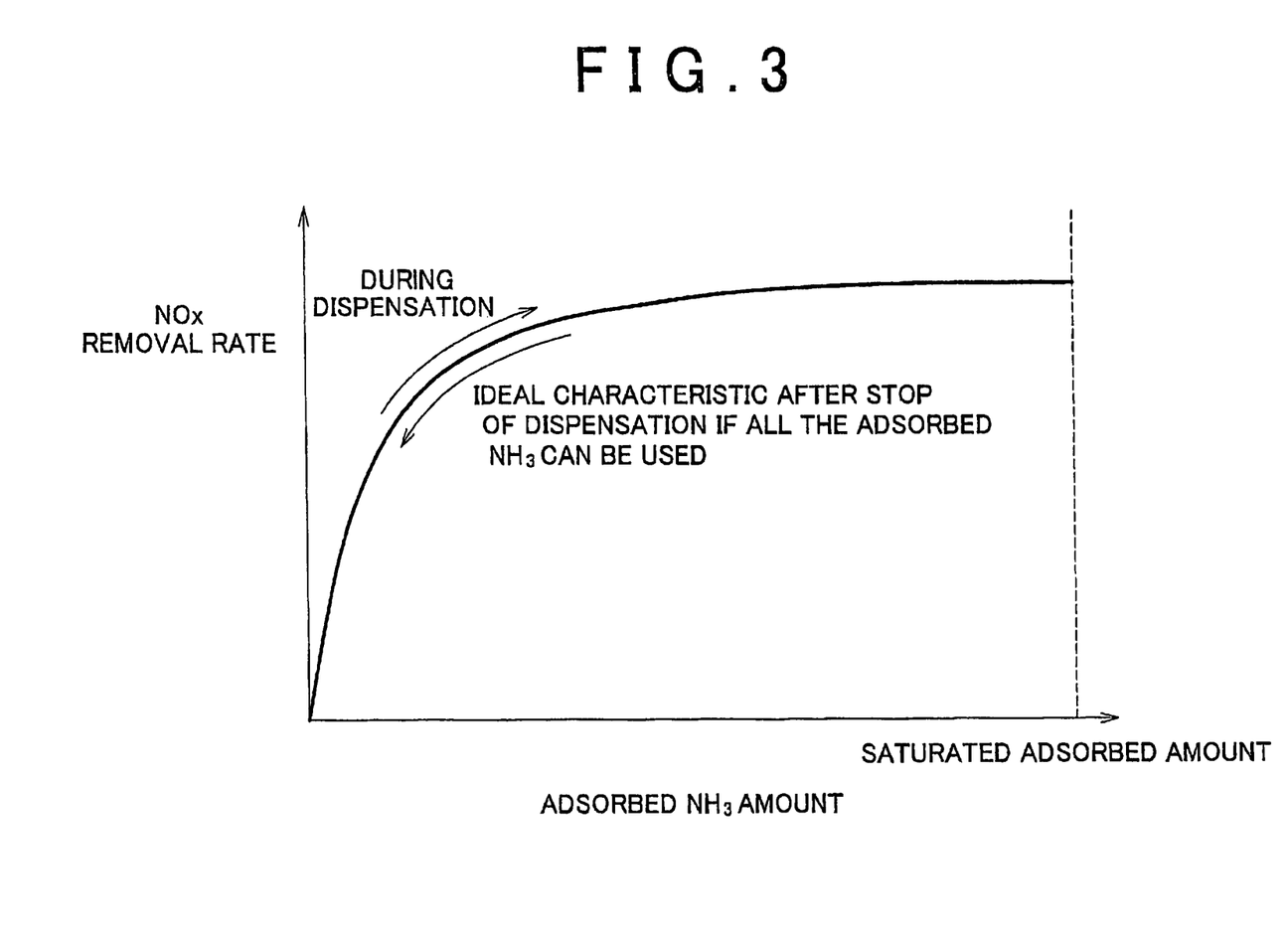
FIG. 3 is a diagram showing a relationship between the adsorbed $NH_3$ amount and the NOx removal rate in the case were the entire amount of $NH_3$ adsorbed on the SCR catalyst can be utilized.

FIG. 2 is a diagram representing relationships between the adsorbed $NH_3$ amount and the NOx removal rate of the SCR catalyst 3. As shown in FIG. 2, if an amount of $NH_3$ needed for the removal of NOx is adsorbed on the SCR catalyst 3 beforehand by the foregoing method and the dispensation of urea water is subsequently stopped, the NOx removal rate becomes lower than during the dispensation of urea water. That is, if the adsorbed $NH_3$ amount relative to the SCR catalyst 3 is fixed, the NOx removal rate differs between during the dispensation of urea water and during a stop of the dispensation due to hysteresis. During the dispensation of urea water, the $NH_3$ formed through the hydrolysis of the urea dispensed as well as the $NH_3$ having been adsorbed on the SCR catalyst 3 directly contributes to the removal of NOx and thus achieves a NOx removal rate. On the other hand, during a stop of the dispensation, only the $NH_3$ adsorbed on the SCR catalyst 3 contributes the removal of NOx and thus achieves a NOx removal rate. If all the adsorbed $NH_3$ contributes to the removal of NOx, substantially the same NOx removal rate as that during the urea water dispensation should be obtained during a stop of the dispensation as shown in FIG. 3. However, while the dispensation of urea water is stopped, a characteristic is exhibited in which no NOx removal rate is achieved although a considerable adsorbed $NH_3$ amount actually exists, as shown in FIG. 2. This represents that the adsorbed $NH_3$ amount at a point P1 at which the NOx removal rate is no longer obtained in the characteristic graph during the stop of the dispensation shown in FIG. 2 does not contribute to the removal of NOx.

From this, the present inventors have found that the adsorption state of $NH_3$ adsorbed on the SCR catalyst 3 is divided into two types. One type of the state is an adsorbed state of $NH_3$ in which the $NH_3$ adsorbed on the SCR catalyst 3 contributes to the removal of NOx, and the other type of the state is an adsorbed state in which the $NH_3$ adsorbed on the SCR catalyst 3 does not contribute to the removal of NOx. Moreover, these adsorbed states slowly shift into each other. Besides, as the temperature of the SCR catalyst increases, the adsorbed state in which the $NH_3$ adsorbed on the SCR catalyst 3 does mot contribute to the removal of NOx changes into the adsorbed state in which the $NH_3$ adsorbed on the SCR catalyst 3 contributes to the removal of NOx. The adsorbed state in which the $NH_3$ adsorbed on the SCR catalyst 3 contributes to the removal of NOx is termed the weakly adsorbed state. The weakly adsorbed state is a state in which the $NH_3$ adsorbed on the SCR catalyst is useful for the reduction reactions of NOx, that is, a state in which the $NH_3$ adsorbed on the SCR catalyst functions as a reductant in the reduction reactions of NOx. The adsorbed state in which the $NH_3$ adsorbed on the SCR catalyst does not contribute to the removal of NOx is termed the strongly adsorbed state. The strongly adsorbed state is a state in which the $NH_3$ adsorbed on the SCR catalyst 3 is not useful for the reduction reactions of NOx unless the $NH_3$ is changed into the weakly adsorbed state, that is, a state in which the $NH_3$ adsorbed on the SCR catalyst does not function as a reductant in the reduction reactions of NOx. One of the weakly adsorbed state and the strongly adsorbed state can change into the other state. Incidentally, the adsorbed amount of $NH_3$ adsorbed on the SCR catalyst 3 in the weakly adsorbed state is termed the actual weakly adsorbed amount. Besides, the adsorbed amount of $NH_3$ adsorbed on the SCR catalyst 3 in strongly adsorbed state is termed the actual strongly adsorbed amount. If the actual weakly adsorbed amount is large and the actual strongly adsorbed amount is small, it is considered that $NH_3$ changes from the weakly adsorbed state into the strongly adsorbed state. On the other hand, if the actual weakly adsorbed amount is small and the actual strongly adsorbed amount is large, it is considered that $NH_3$ changes from the strongly adsorbed state into the weakly adsorbed state. Besides, it is considered that as the temperature of the SCR catalyst 3 rises, the adsorbed $NH_3$ changes from the strongly adsorbed state into the weakly adsorbed state. As shown in FIG. 2, the adsorbed $NH_3$ amount that is adsorbed on the catalyst at the time point P1 at which the NOx removal rate is no longer obtained in the characteristic during the stop of the dispensation is the actual strongly adsorbed amount. The adsorbed $NH_3$ amount that increases from the point P1 at which the NOx removal rate is no longer obtained in the characteristic during the stop of the dispensation is the actual weakly adsorbed amount.

Figure 4:
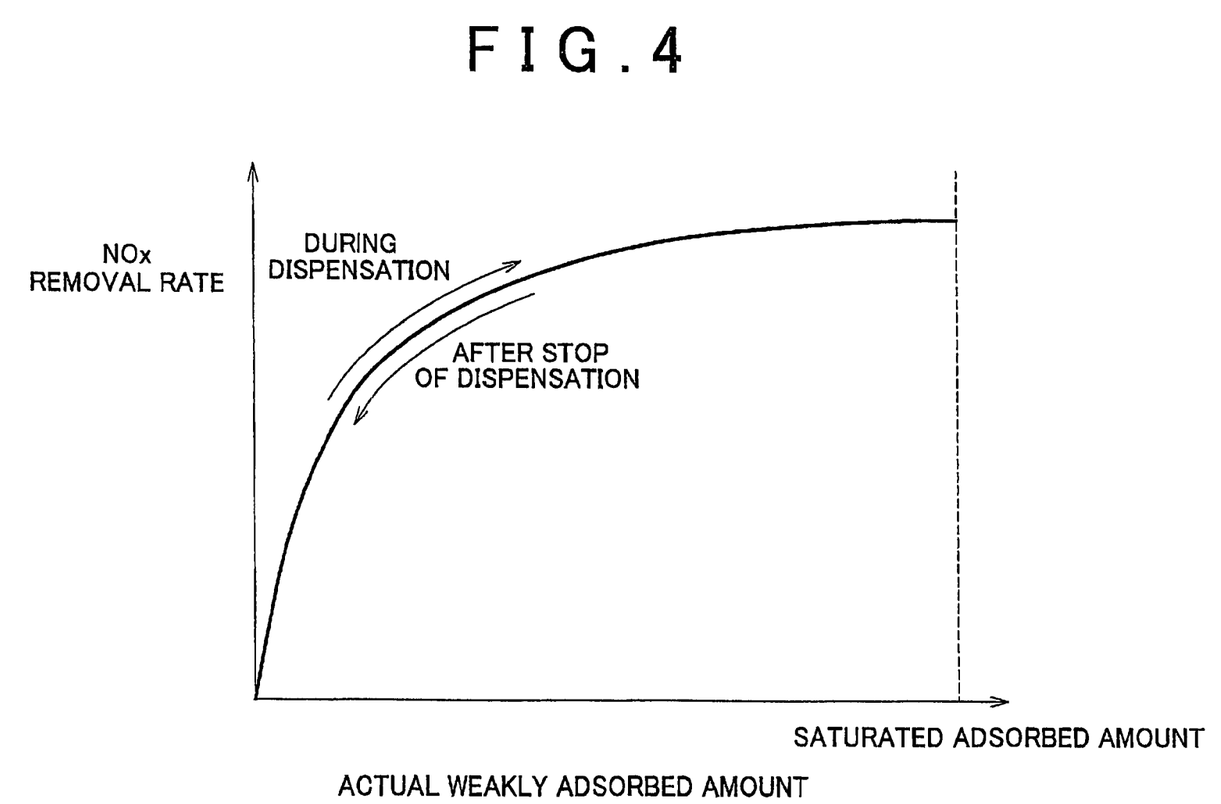
FIG. 4 is a diagram shoming a relationship between the actual weakly adsorbed amount on the SCR catalyst and the NOx removal rate thereof.

It is to be noted herein that since the $NH_3$ in the strongly adsorbed state is not useful for the reduction reactions of NOx as described above, the actual strongly adsorbed amount of $NH_3$ does not contribute to the removal of NOx. Therefore, the NOx removal rate is not affected by the actual strongly adsorbed amount, no matter whether it is large or small. On the other hand, since the $NH_3$ in the weakly adsorbed state is useful for the reduction reactions of NOx, the actual weakly adsorbed amount of $NH_3$ contributes to the removal of NOx. FIG. 4 is a diagram representing a relationship between the actual weakly adsorbed amount of $NH_3$ and the NOx removal rate of the SCR catalyst 3. As shown in FIG. 4, if the actual weakly adsorbed amount is small, the NOx removal rate is accordingly low, and if the actual weakly adsorbed amount is large, the NOx removal rate is accordingly high. Besides, between during the urea water dispensation and during the stop of the dispensation, there is no difference in characteristic, and no hysteresis exists. This is because the $NH_3$ in the weakly adsorbed state contributes to the removal of NOx, similarly to the $NH_3$ that is produced by hydrolysis during the dispensation of urea water. Thus, the present inventors have found that the NOx removal rate obtained in the case where the adsorbed $NH_3$ is used for the removal of NOx has a correlation with the actual weakly adsorbed amount.

Therefore, in this embodiment, the actual weakly adsorbed amount of $NH_3$ is calculated, and the dispensation of urea water is controlled according to the calculated actual weakly adsorbed amount. According to the embodiment, since the dispensation control of the urea water is performed according to only the actual weakly adsorbed amount of $NH_3$ without taking the actual strongly adsorbed amount thereof into account, it is possible to perform a control that uses only the adsorbed $NH_3$ amount that contributes to the removal of NOx, of the adsorbed $NH_3$ amount that is adsorbed on the SCR catalyst 3. Hence, there no longer occurs a drawback of the dispensation control of urea water caused by taking into account the adsorbed $NH_3$ amount that does not contribute to the removal of NOx, so that an optimum dispensation control of urea water to the SCR catalyst 3 can be performed. That is, as such a drawback, a desired NOx removal rate sometimes cannot be sufficiently obtained if urea water is dispensed by taking into account the adsorbed $NH_3$ amount that does not contribute to the removal of NOx so as to control the adsorbed $NH_3$ amount to a target value. On the other hand, in this embodiment, since urea water is dispensed by taking into account only the actual weakly adsorbed amount of $NH_3$ that is the adsorbed $NH_3$ amount that contributes to the removal of NOx, an optimum dispensed amount is achieved, so that if the actual weakly adsorbed amount of $NH_3$ is controlled to a target value, a desired NOx removal rate can be obtained.

Figure 5:
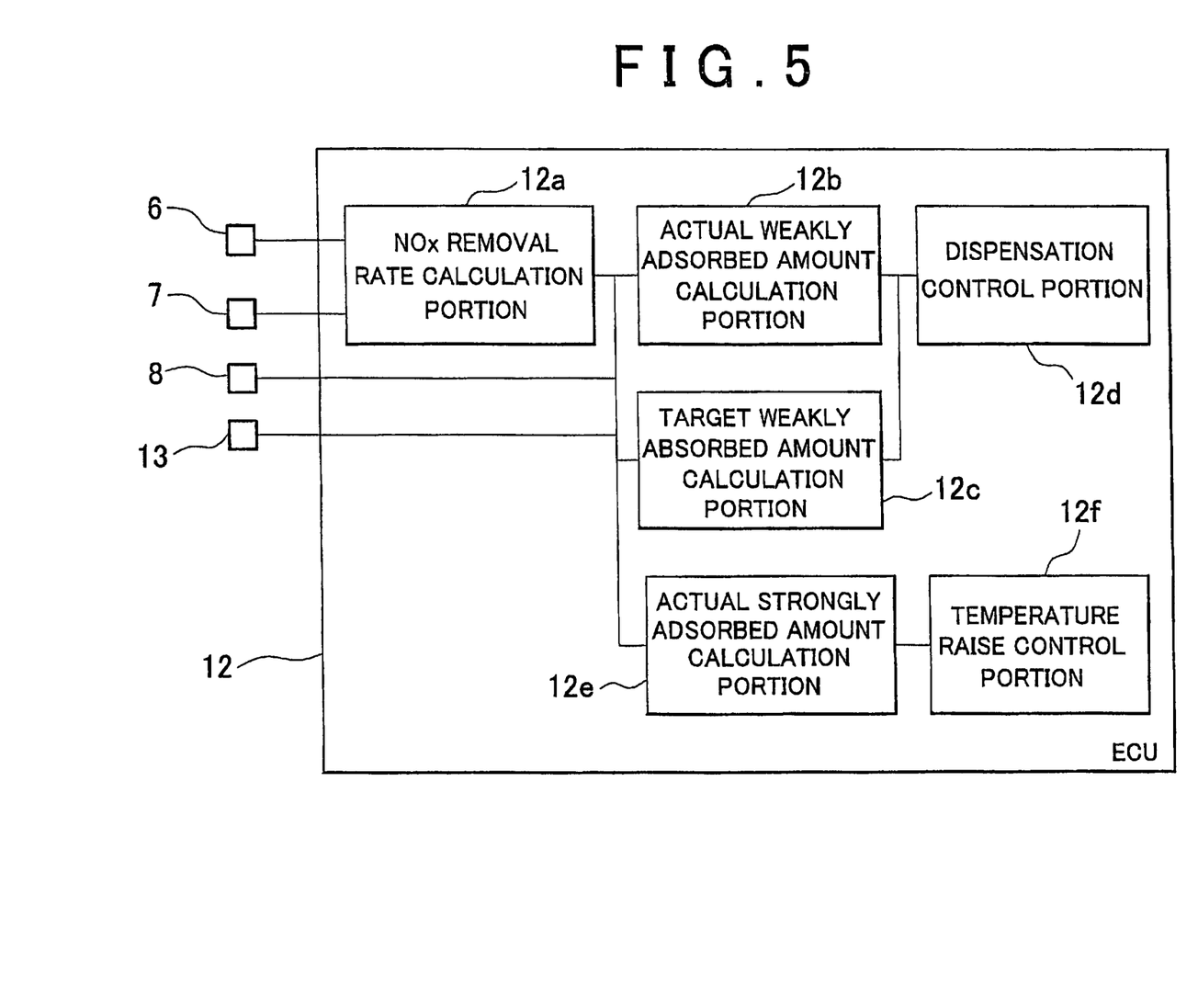
FIG. 5 is a control block diagram in an ECU in accordance with an embodiment of the invention.

FIG. 5 is a control block diagram in the ECU 12 in accordance with the embodiment. With reference to FIG. 5, a concrete construction that controls the dispensation of urea water from the urea water dispensation valve 4 according to the actual weakly adsorbed amount of $NH_3$ will be described.

As shown in FIG. 5, the ECU 12 has a NOx removal rate calculation portion 12a that calculates a NOx removal rate of the SCR catalyst 3 from the NOx concentration acquired from the first NOx sensor 6 and the second NOx sensor 7. The NOx removal rate can be found by dividing a value obtained by subtracting the NOx concentration detected by the second NOx sensor 7 (hereinafter, referred to as outflow NOx concentration) from the NOx concentration detected by the first NOx sensor 6 (hereinafter, referred to as inflow NOx concentration) by the inflow NOx concentration.

The ECU 12 has an actual weakly adsorbed amount calculation portion 12b that calculates an actual weakly adsorbed amount on the basis of the amount of consumption of $NH_3$ that is derived from the NOx removal rate that is calculated by the NOx removal rate calculation portion 12a, the temperature of the SCR catalyst 3 detected by the temperature sensor 8, the amount of shift of $NH_3$ between the strongly adsorbed state and the weakly adsorbed state, the previous dispensed amount of urea water, and an estimation model for the actual weakly adsorbed amount of $NH_3$.

A reduced NOx amount that is actually reduced can be calculated from the NOx removal rate, and an inflow NOx amount calculated by multiplying the inflow NOx concentration acquired by the first NOx sensor 6 by the amount of air detected by the air flow meter 13. The amount of $NH_3$ that is reduced by the reduction reaction into a reduced NOx amount is the amount of consumption of $NH_3$ (hereinafter, referred to as consumed $NH_3$ amount). A total adsorbed $NH_3$ amount on the SCR catalyst 3 is calculated from the consumed $NH_3$ amount and the previous dispensed amount of urea water. The calculated total adsorbed $NH_3$ amount on the SCR catalyst 3 and the SCR catalyst bed temperature detected by the temperature sensor 8 are taken into an estimation model for the actual weakly adsorbed amount of $NH_3$, whereby a tentative actual weakly adsorbed amount is calculated. The estimation model for the actual weakly adsorbed amount divides the total adsorbed $NH_3$ amount on the SCR catalyst 3 into an actual weakly adsorbed amount and an actual strongly adsorbed amount at a predetermined proportion. The predetermined proportion herein changes depending on the SCR catalyst bed temperature, and can be found beforehand through experiments, verification, etc.

Figure 6:
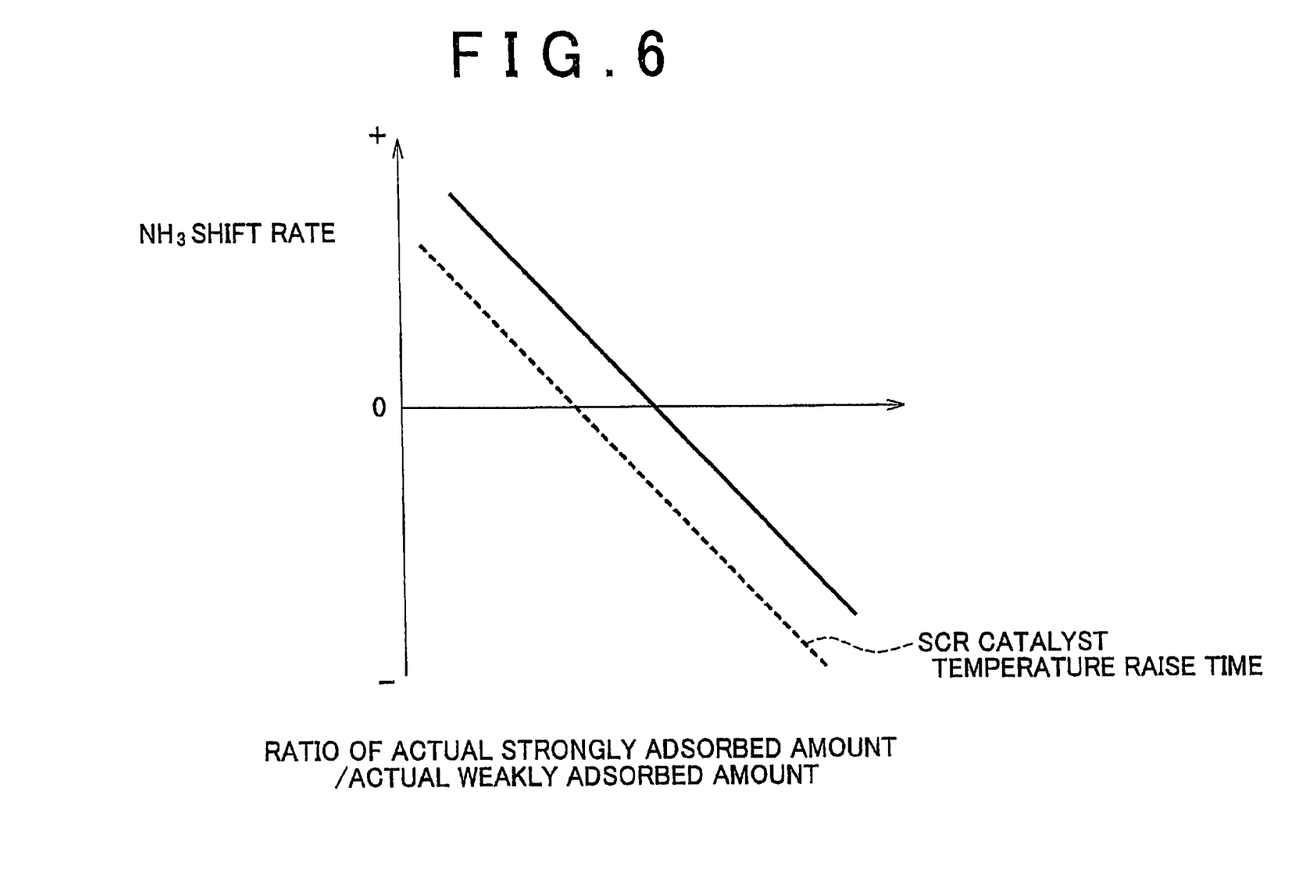
FIG. 6 is a diagram showing a model for $NH_3$ shift rate in accordance with the embodiment.

FIG. 6 is a diagram showing a mode of rate of shift of $NH_3$. The amount of shift of $NH_3$ between the strongly adsorbed state and the weakly adsorbed state is calculated according to the shift rate model of $NH_3$ shown in FIG. 6, and the amount of increase or decrease of the actual weakly adsorbed amount caused by the shift of $NH_3$ between the strongly adsorbed state and the weakly adsorbed state is derived from the amount of shift. At this time, in the shift rate model of $NH_3$ shown in FIG. 6, the characteristic can be changed according to the SCR catalyst bed temperature detected by the temperature sensor 8.

Then, by summing the calculated tentative actual weakly adsorbed amount and the calculated amount of increase/decrease in the actual weakly adsorbed amount, an actual weakly adsorbed amount is calculated. In this manner, the actual weakly adsorbed amount is calculated by the actual weakly adsorbed amount calculation portion 12b.

Figure 7:
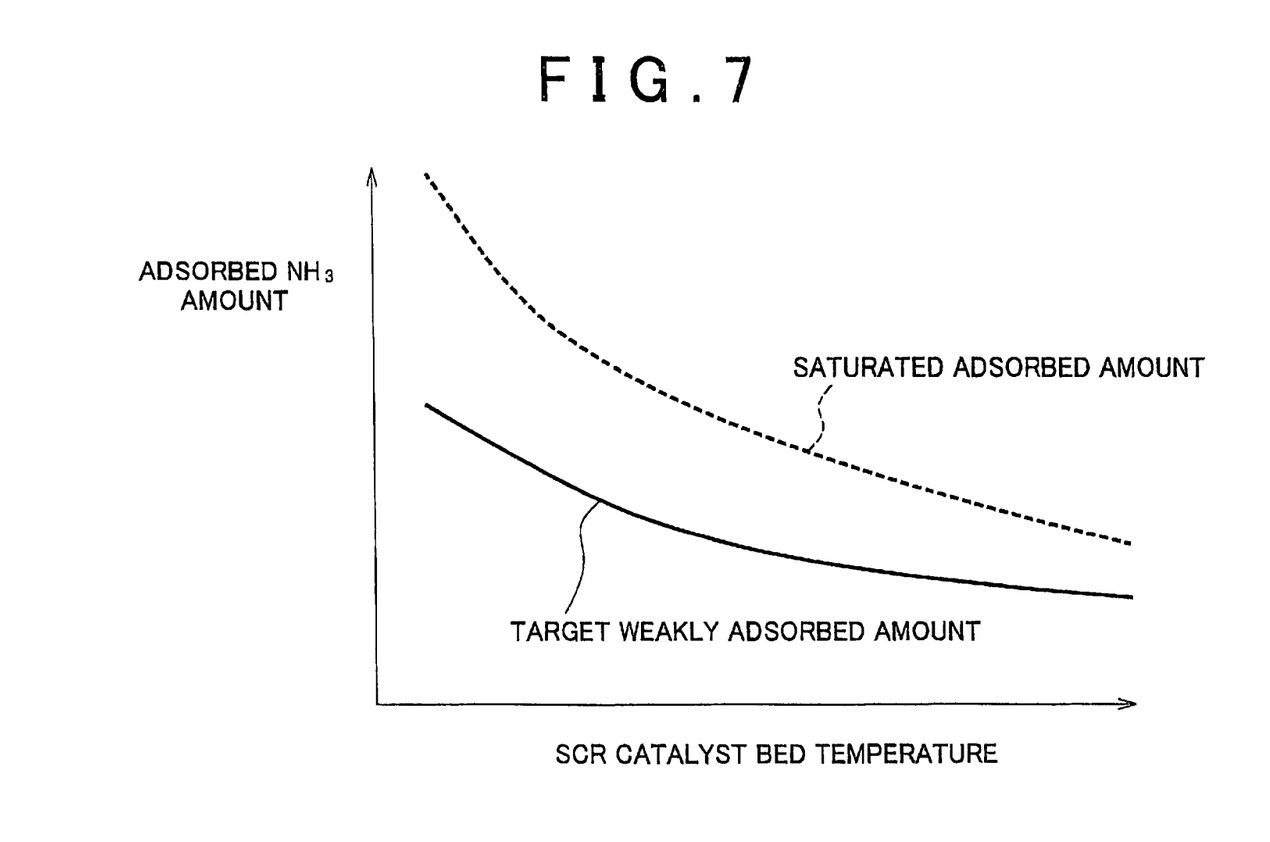
FIG. 7 is a diagram showing a setting line of a target weakly adsorbed $NH_3$ amount in accordance with an embodiment of the invention.

The ECU 12 has a target weakly adsorbed amount calculation portion 12c that calculates a target weakly adsorbed amount on the basis of the amount of consumption of $NH_3$ derived from the NOx removal rate calculated by the NOx removal rate calculation portion 12a, the temperature of the SCR catalyst 3 detected by the temperature sensor 8, and a saturated characteristic of the actual weakly adsorbed amount. FIG. 7 is a diagram showing a setting line of a target weakly adsorbed amount. As shown in FIG. 7, the setting line of the target weakly adsorbed amount changes according to the temperature of the SCR catalyst 3, and is set so as not to exceed the saturated characteristic of the actual weakly adsorbed amount (saturated adsorbed amount). Such a setting line of the target weakly adsorbed amount is determined by taking a balance between the NOx removal rate's decreasing due to small amount of $NH_3$ in the weakly adsorbed state and passage of $NH_3$ through the catalyst due to large amount of $NH_3$ in the weakly adsorbed state. With this arrangement, the target weakly adsorbed amount calculation portion 12c calculates the target weakly adsorbed amount.

The ECU 12 further has a dispensation control portion 12d that performs a dispensation, control of urea water that is dispensed via the urea water dispensation valve 4 in such a control manner that the actual weakly adsorbed amount calculated by the actual weakly adsorbed amount calculation portion 12b becomes equal to the target weakly adsorbed amount calculated by the target weakly adsorbed amount calculation portion 12c. Hence, the actual weakly adsorbed amount approaches the target weakly adsorbed amount that is an optimum adsorbed $NH_3$ amount that contributes to the removal of NOx, so that it is possible to perform optimum dispensation control of urea water for the SCR catalyst 3.

ECU 12 also has an actual strongly adsorbed amount calculation portion 12e that calculates an actual strongly adsorbed amount of $NH_3$ that is adsorbed on the SCR catalyst 3 in the strongly adsorbed state. The actual strongly adsorbed amount calculation portion 12e calculates the actual strongly adsorbed amount of $NH_3$ on the basis of the actual weakly adsorbed amount calculated by the actual weakly adsorbed amount calculation portion 12b, the consumed $NH_3$ amount derived from the NOx removal rate calculated by the NOx removal rate calculation portion 12a, and the previous dispensed amount of urea water. A reduced NOx amount that is an amount of actually reduced NOx, can be calculated from an inflow NOx amount calculated by multiplying the inflow NOx concentration acquired by the first NOx sensor 6 by the amount of air detected by the air flow meter 13, and from the NOx removal rate. The amount of $NH_3$ that undergoes the reduction reaction with the amount of reduced NOx is a consumed $NH_3$ amount. From the consumed $NH_3$ amount and the previous dispensed amount of urea water, a total amount of $NH_3$ adsorbed on the SCR catalyst 3 is calculated. The actual strongly adsorbed amount of $NH_3$ is calculated by subtracting the actual weakly adsorbed amount calculated by the actual weakly adsorbed amount calculation portion 12b from the calculated total adsorbed $NH_3$ amount on the SCR catalyst 3. In this manner, the actual strongly adsorbed amount can be calculated by the actual strongly adsorbed amount calculation portion 12e.

The ECU 12 also has a temperature raise control portion 12f of raising the temperature of the SCR catalyst 3 if the actual strongly adsorbed amount of $NH_3$ calculated by the actual strongly adsorbed amount calculation portion 12e exceeds a predetermined amount that serves as a threshold value for determining whether or not there arises a possibility of occurrence of the passage of high-concentration $NH_3$ through the SCR catalyst 3. The predetermined amount is an actual strongly adsorbed amount of $NH_3$ excess of which gives rise to a possibility of occurrence of the passage of high-concentration $NH_3$ through the SCR catalyst 3, that is, a threshold value for determining whether or not there arises a possibility of occurrence of the passage of high-concentration $NH_3$ through the SCR catalyst 3. The temperature raise control portion 12f compares the actual strongly adsorbed amount calculated by the actual strongly adsorbed amount calculation portion 12e with the predetermined amount. Then, if the actual strongly adsorbed amount of $NH_3$ exceeds the predetermined amount, the temperature raise control portion 12f raises the temperature of the SCR catalyst 3 to a range of 300 to 400° C. As a method employed in this embodiment to raise the temperature of the SCR catalyst 3, the same control as the forced filter regeneration control of raising the temperature of the DPF 11 disposed upstream of the SCR catalyst 3 is performed. Specifically, as in the forced filter regeneration control, fuel is dispensed from the fuel dispensation valve 9, and the dispensed fuel is oxidized by the oxidation catalyst 10, so that the temperature of exhaust gas is raised. The temperature-raised exhaust gas passes through the DPF 11, and flows into the SCR catalyst 3, so that the temperature of the SCR catalyst 3 is raised. Incidentally, the method of raising the temperature of the SCR catalyst 3 is not limited to the foregoing method in accordance with the invention, but may also be a method in which the temperature of exhaust gas is raised by a burner device that is disposed in the exhaust passageway 2 upstream of the SCR catalyst 3, or a method in which an electric heater is provided for the SCR catalyst 3, and is used to directly heat the SCR catalyst 3.

Figure 8:
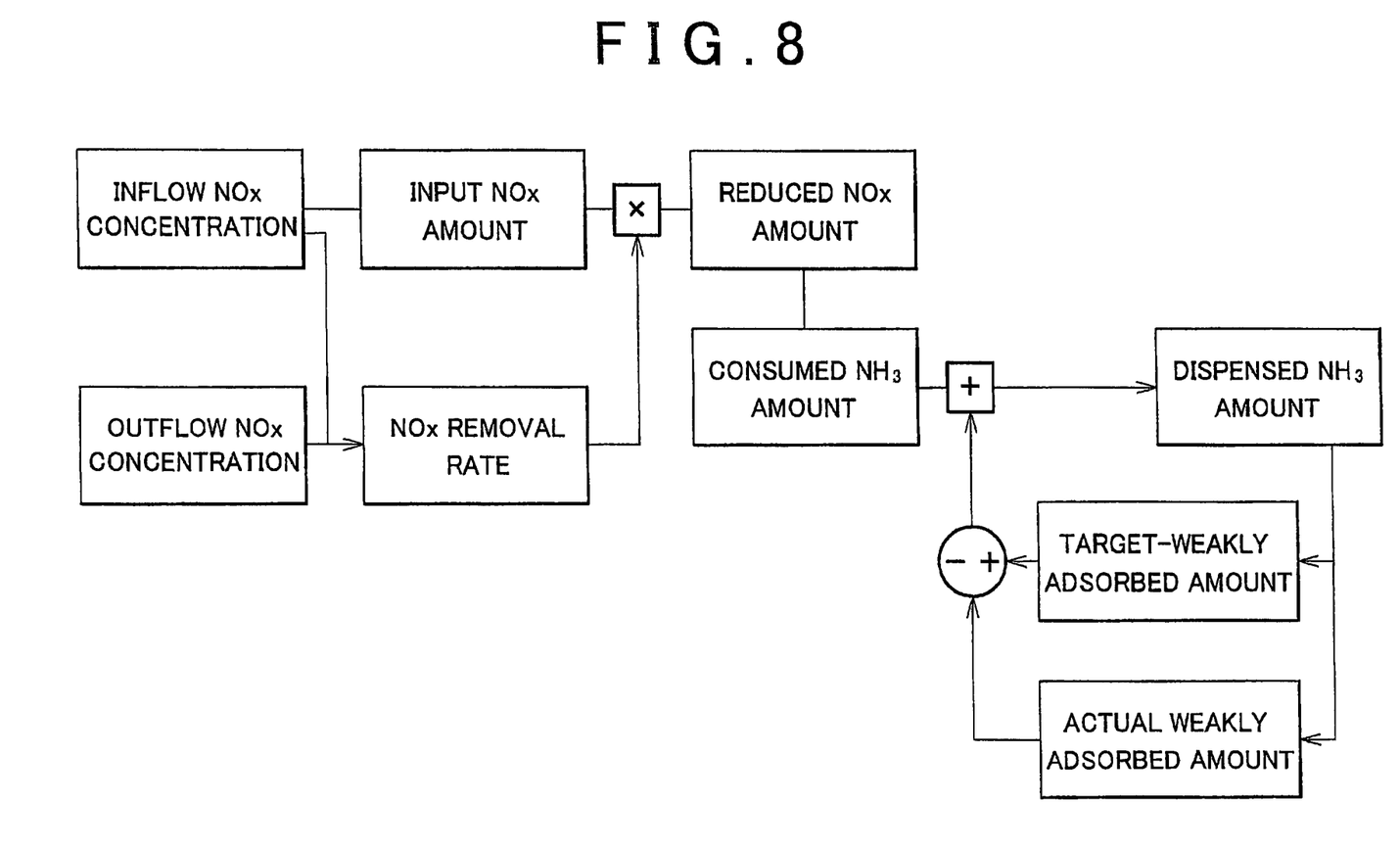
FIG. 8 is a diagram showing a control model of the dispensed amount of urea water in accordance with an embodiment.

FIG. 8 is a diagram showing a control model for controlling the urea water dispensation amount in accordance with the embodiment. The ECU 12 calculates an inflow NOx amount that flows into the SCR catalyst 3, from the inflow NOx concentration acquired by the first NOx sensor 6 and the amount of air passing through the exhaust passageway 2 which is detected by the air flow meter 13. The ECU 12 calculates the NOx removal rate of the SCR catalyst 3 form the inflow NOx concentration acquired by the first NOx sensor 6 and the outflow NOx concentration acquired by the second NOx sensor 7. Then, the reduced NOx amount is calculated by multiplying, the inflow NOx amount by the NOx removal rate. From the reduced NOx amount, the consumed $NH_3$ amount that has undergone the reduction reaction is calculated. In the meantime, the actual weakly adsorbed amount and the target weakly adsorbed amount are calculated as described above. Then, a sum of the consumed $NH_3$ amount and such an $NH_3$ amount that the actual weakly adsorbed amount is used as a target weakly adsorbed amount are calculated as a dispensed $NH_3$ amount (dispensed amount of urea water).

Figure 9:
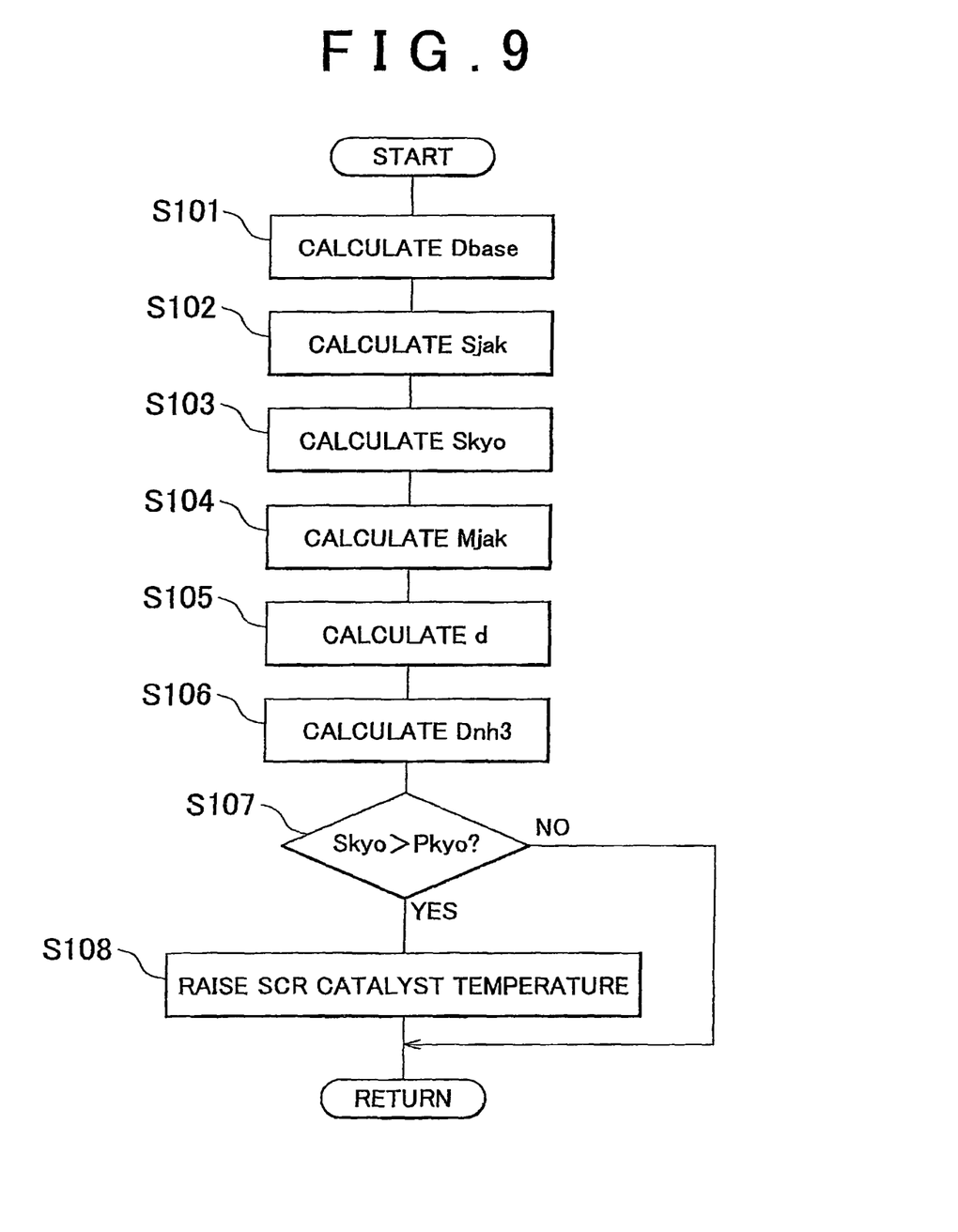
FIG. 9 is a flowchart showing a urea water dispensation in accordance with an embodiment of the invention.

A urea water dispensation control routine that the ECU 12 performs will be described with reference to a flowchart shown in FIG. 9. FIG. 9 is a flowchart showing the urea water dispensation control routine. This routine is executed by the ECU 12 at every predetermined time.

When the routine shown in FIG. 9 is started, the ECU 12 calculates a consumed $NH_3$ amount Dbase in S101. The consumed $NH_3$ amount Dbase is calculated from the reduced NOx amount that is derived at the dispensation control portion 12d by multiplying the inflow NOx amount by the NOx removal rate.

In S102, the ECU 12 calculates an actual weakly adsorbed amount Sjak of $NH_3$. The actual weakly adsorbed amount Sjak is calculated at the actual weakly adsorbed amount calculation portion 12b. A tentative actual weakly adsorbed amount is calculated by taking the total adsorbed $NH_3$ amount on the SCR catalyst 3 and the SCR catalyst bed temperature detected by the temperature sensor 8 into an estimation model for estimating the actual weakly adsorbed amount. Next, an increase/decrease amount of the actual weakly adsorbed amount is calculated by taking the SCR catalyst bed temperature detected by the temperature sensor 8 into an $NH_3$ shift rate model. Then, an actual weakly adsorbed amount Sjak of $NH_3$ is calculated by summing the tentative actual weakly adsorbed amount and the increase/decrease amount of the actual weakly adsorbed amount.

In S103, the ECU 12 calculates an actual strongly adsorbed amount Skyo of $NH_3$. The actual strongly adsorbed amount Skyo is calculated at the actual strongly adsorbed amount calculation portion 12e. The actual strongly adsorbed amount Skyo is calculated by subtracting the actual weakly adsorbed amount Sjak from the total adsorbed $NH_3$ amount on the SCR catalyst 3.

In S104, the ECU 12 calculates a target weakly adsorbed amount Mjak. The target weakly adsorbed amount Mjak is calculated at the target weakly adsorbed amount calculation portion 12c. The target weakly adsorbed amount Mjak is calculated by taking the SCR catalyst bed temperature detected by the temperature sensor 8 onto the setting line of the target weakly adsorbed amount shown in FIG. 7.

In S105, the ECU 12 calculates a differential-corrected dispensed amount d. The differential-corrected dispensed amount d is calculated at the dispensation control portion 12d from a difference between the actual weakly adsorbed amount Sjak and the target weakly adsorbed amount Mjak.

In S106, the ECU 12 calculates and dispenses a dispensed $NH_3$ amount Dnh3. The dispensed $NH_3$ amount Dnh3 is calculated at the dispensation control portion 12d by summing the consumed $NH_3$ amount Dbase and the differential-corrected dispensed amount d. After the dispensed $NH_3$ amount Dnh3 is calculated, the ECU 12 executes the dispensation of urea water.

In S107, the ECU 12 determines whether or not the actual strongly adsorbed amount Skyo of $NH_3$ exceeds a predetermined amount Pkyo. This step of determination is performed at the temperature raise control portion 12f. If in S107 an affirmative determination that the actual strongly adsorbed amount Skyo exceeds the predetermined amount Pkyo is made, the process proceeds to S108. On the other hand, if in S107 a negative determination that the actual strongly adsorbed amount Skyo does not exceed the predetermined amount Pkyo is made, this routine is temporarily stopped.

In S108, the ECU 12 raises the temperature of the SCR catalyst 3. That is, the temperature raise control portion 12f dispenses fuel from the fuel dispensation valve 9. Because the temperature of the SCR catalyst 3 is raised, $NH_3$ shifts from the strongly adsorbed state into the weakly adsorbed state on the SCR catalyst 3, or desorbs from the SCR catalyst 3. Incidentally, if $NH_3$ desorbs from the catalyst, the amount of discharge of $NH_3$ is controlled by, for example, controlling the temperature raising rate so that the large amount of $NH_3$ is not let out from the SCR catalyst 3 in a short period of time, or disposing an oxidation catalyst in the exhaust passageway downstream of the SCR catalyst 3. The temperature raise of the SCR catalyst 3 is continued until the actual strongly adsorbed amount Skyo decreases to a prescribed amount that is determined beforehand. Due to this, the actual strongly adsorbed amount Skyo of $NH_3$ on the SCR catalyst 3 decreases. After the process of this step, the ECU 12 ends the present execution of this routine.

According to the above-described routine, an optimum dispensation control of urea water can be performed by taking into account the state of adsorption of $NH_3$ on the SCR catalyst 3.

Figure 10:
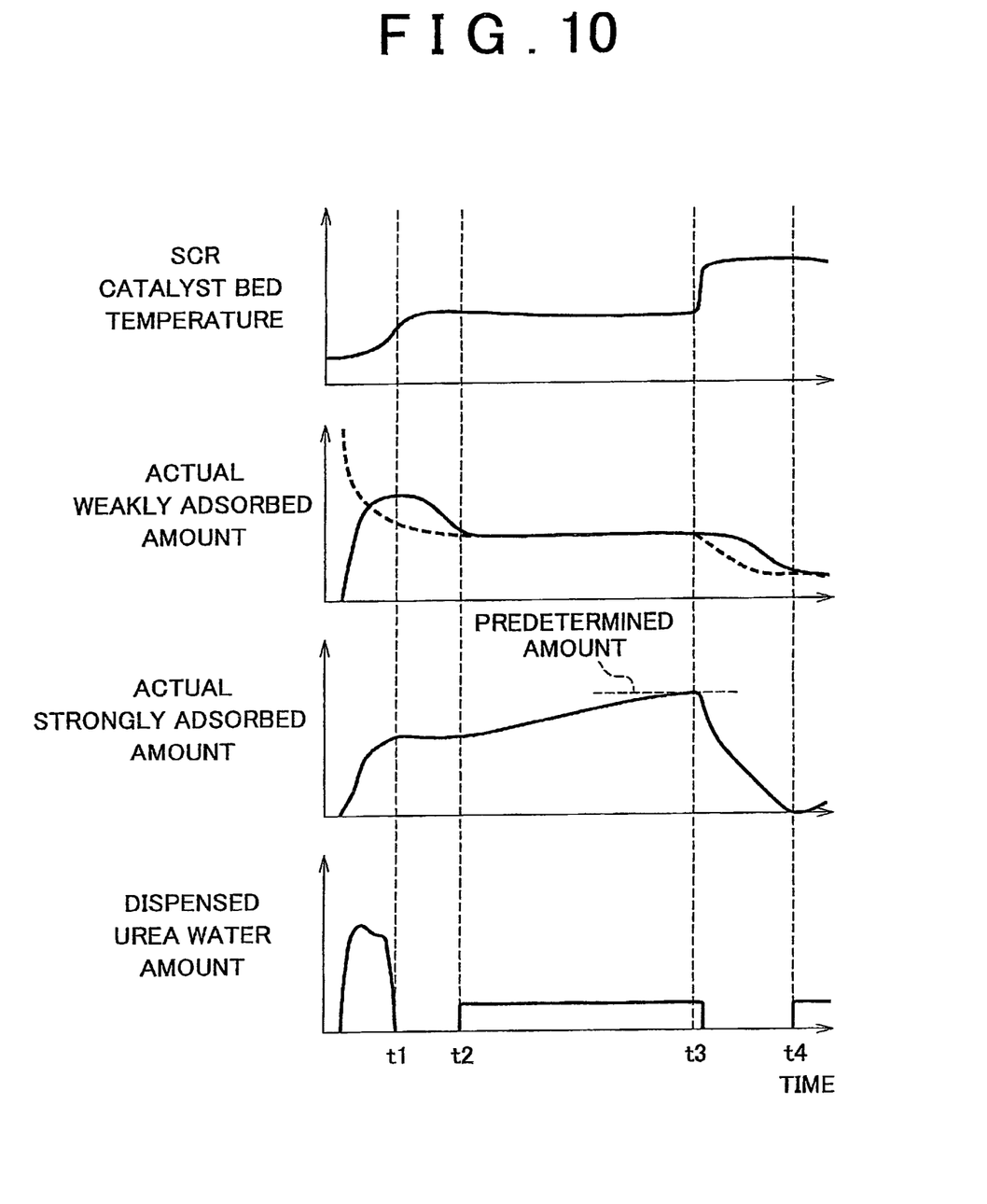
FIG. 10 is a diagram showing controlled states in a urea water dispensation control in accordance with an embodiment of the invention.

FIG. 10 is a diagram showing controlled states in the urea water dispensation control in accordance with the embodiment. As shown in FIG. 10, when the control is started, the actual weakly adsorbed amount of $NH_3$ is considerably smaller than the target weakly adsorbed amount of $NH_3$, so that a large amount of urea water is dispensed until time t1. At and after time t1, the actual weakly adsorbed amount of $NH_3$ is excessively larger than the target weakly adsorbed amount, so that the dispensation of urea water is stopped. At and after time t2 at which the actual weakly adsorbed amount of $NH_3$ becomes substantially equal to the target weakly adsorbed amount, the dispensation of urea water is performed so that the actual weakly adsorbed amount of $NH_3$ will follow the target weakly adsorbed amount. The dispensed $NH_3$ amount occurring during this period is a sum of the consumed $NH_3$ amount and such an $NH_3$ amount that the actual weakly adsorbed amount is used as a target weakly adsorbed amount. Besides, during this period, the actual strongly adsorbed amount of $NH_3$ continues to increase unless there is a change of state into the weakly adsorbed state. Therefore, at time t3, the actual strongly adsorbed amount exceeds the predetermined amount, and therefore the temperature of the SCR catalyst 3 is raised. At this time, $NH_3$ changes from, the strongly adsorbed state into the weakly adsorbed state, and the actual weakly adsorbed amount of $NH_3$ becomes larger than the target weakly adsorbed amount, so that the dispensation of urea water is stopped. Then, at time t4 at which the temperature raise of the SCR catalyst ends, urea water is dispensed again so that the actual weakly adsorbed amount will follow the target weakly adsorbed amount.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. An internal combustion engine exhaust gas control apparatus characterized by comprising:
    a selective reduction type NOx catalyst disposed in an exhaust passageway of an internal combustion engine, wherein a state of adsorption of $NH_3$ on the selective reduction type NOx catalyst includes a weakly adsorbed state in which $NH_3$ adsorbed on the NOx catalyst is useful for a reduction reaction of NOx, and a strongly adsorbed state in which $NH_3$ adsorbed on the NOx catalyst is not useful for the reduction reaction of the NOx unless the state of adsorption of $NH_3$ is changed into the weakly adsorbed state;
    a reductant dispensation portion that is disposed in the exhaust passageway upstream of the selective reduction type NOx catalyst and that dispenses a reductant for supplying $NH_3$ to the selective reduction type NOx catalyst;
    an actual weakly adsorbed amount calculation portion that calculates an actual weakly adsorbed amount of $NH_3$ that is adsorbed on the selective reduction type NOx catalyst in the weakly adsorbed state; and
    a dispensation control portion that performs a dispensation control of the reductant dispensed by the reductant dispensation portion, according to the actual weakly adsorbed amount calculated by the actual weakly adsorbed amount calculation portion.

2. The exhaust gas control apparatus according to claim 1, further comprising a target weakly adsorbed amount calculation portion that calculates a target weakly adsorbed amount of $NH_3$ that is to be adsorbed on the selective reduction type NOx catalyst in the weakly adsorbed state,
    wherein the dispensation control portion performs the dispensation control of the reductant dispensed by the reductant dispensation portion in such a control manner that the actual weakly adsorbed amount calculated by the actual weakly adsorbed amount calculation portion becomes equal to the target weakly adsorbed amount calculated by the target weakly adsorbed amount calculation portion.

3. The exhaust gas control apparatus according to claim 2, further comprising:
    a first NOx concentration acquisition portion that acquires information about NOx concentration in exhaust gas that flows into the selective reduction type NOx catalyst;
    a second NOx concentration acquisition portion that acquires information about the NOx concentration in the exhaust gas that flows out from the selective reduction type NOx catalyst;
    a NOx removal rate calculation portion that calculates a NOx removal rate of the selective reduction type NOx catalyst from the information about the NOx concentration acquired by the first NOx concentration acquisition portion and the information about the NOx concentration acquired by the second NOx concentration acquisition portion; and
    a catalyst temperature acquisition portion that acquires information about temperature of the selective reduction type NOx catalyst,
    wherein:
        the actual weakly adsorbed amount calculation portion calculates the actual weakly adsorbed amount based on an amount of consumption of $NH_3$ derived from the NOx removal rate calculated by the NOx removal rate calculation portion, the information about the temperature of the selective reduction type NOx catalyst acquired by the catalyst temperature acquisition portion, an amount of shift of $NH_3$ between the strongly adsorbed state and the weakly adsorbed state, and a previously dispensed amount of the reductant, and an estimation model for the actual weakly adsorbed amount; and
        the target weakly adsorbed amount calculation portion calculates the target weakly adsorbed amount based on the amount of consumption of $NH_3$ derived from the NOx removal rate calculated by the NOx removal rate calculation portion, the information about the temperature of the selective reduction type NOx catalyst acquired by the catalyst temperature acquisition portion, and a saturated characteristic of the actual weakly adsorbed amount.

4. The exhaust gas control apparatus according to claim 1, further comprising:
    an actual strongly adsorbed amount calculation portion that calculates an actual strongly adsorbed amount of $NH_3$ that is adsorbed on the selective reduction type NOx catalyst in the strongly adsorbed state; and
    a temperature raise control portion that raises temperature of the selective reduction type NOx catalyst if the actual strongly adsorbed amount calculated by the actual strongly adsorbed amount calculation portion exceeds a predetermined amount that is used as a threshold value for determining whether or not passage of high-concentration $NH_3$ through the selective reduction type NOx catalyst is about to occur.

5. The exhaust gas control apparatus according to claim 1, wherein the weakly adsorbed state is a state in which $NH_3$ adsorbed on the NOx catalyst functions as the reductant in the reduction reaction of NOx, and the strongly adsorbed state is a state in which $NH_3$ adsorbed on the NOx catalyst does not function as the reductant in the reduction reaction of NOx.

6. A reductant dispensing method for an internal combustion engine exhaust gas control apparatus that includes a selective reduction type NOx catalyst disposed in an exhaust passageway of an internal combustion engine, and a reductant dispensation portion that is disposed in the exhaust passageway upstream of the selective reduction type NOx catalyst and that dispenses a reductant for supplying $NH_3$ to the selective reduction type NOx catalyst, the method comprising:
    calculating an actual weakly adsorbed amount of $NH_3$ that is adsorbed on the selective reduction type NOx catalyst in a weakly adsorbed state in which $NH_3$ adsorbed on the selective reduction type NOx catalyst is useful for a reduction reaction of NOx; and
    performing a dispensation control of the reductant dispensed by the reductant dispensation portion, according to the actual weakly adsorbed amount calculated,
    wherein a state of adsorption of $NH_3$ on the selective reduction type NOx catalyst includes the weakly adsorbed state, and a strongly adsorbed state in which $NH_3$ adsorbed on the NOx catalyst is not useful for the reduction reaction of the NOx unless the state of adsorption of $NH_3$ is changed into the weakly adsorbed state.

7. The reductant dispensing method according to claim 6, wherein
    the weakly adsorbed state is a state in which $NH_3$ adsorbed on the NOx catalyst functions as the reductant in the reduction reaction of NOx, and the strongly adsorbed state is a state in which $NH_3$ adsorbed on the NOx catalyst does not function as the reductant in the reduction reaction of NOx.

\* \* \* \* \*